United States Patent [19]
Zilberman

[11] Patent Number: 5,156,475
[45] Date of Patent: Oct. 20, 1992

[54] KEYBOARD DIVIDED BY CENTRAL INVERTED T-SHAPED ENTRY-SPACE KEY

[76] Inventor: Arkady Zilberman, 1952 Lamarie Dr., Powell, Ohio 43065

[21] Appl. No.: 623,116

[22] Filed: Dec. 6, 1990

[51] Int. Cl.$^5$ ................................................ B41J 5/08
[52] U.S. Cl. .................................. 400/472; 400/489; 400/490; 235/145 R
[58] Field of Search ............... 400/472, 473, 485, 486, 400/489, 488, 490, 495; 235/145 R; 434/227, 231

[56] References Cited

U.S. PATENT DOCUMENTS

| | | | |
|---|---|---|---|
| 4,244,659 | 1/1981 | Malt | 400/486 |
| 4,564,751 | 1/1986 | Alley et al. | 400/473 |
| 4,579,470 | 4/1986 | Casey | 400/486 |
| 4,661,005 | 4/1987 | Lahr | 400/472 |

FOREIGN PATENT DOCUMENTS

| | | | |
|---|---|---|---|
| 0284007 | 9/1988 | European Pat. Off. | 400/472 |
| 972465 | 10/1959 | Fed. Rep. of Germany | 400/486 |
| 2587815 | 3/1987 | France | 400/472 |
| 2122947 | 7/1984 | United Kingdom | 400/472 |

*Primary Examiner*—Eugene H. Eickholt
*Attorney, Agent, or Firm*—Ilya Zborovsky

[57] ABSTRACT

A keyboard comprises a plurality of regular keys, and an inverted T-shaped key subdividing the regular keys into two sections including one section for preferably left-hand operation and another section preferably for right-hand operation. A keyboard further comprises a trackball and/or two rollers requiring minimal hand movement in using them for mouse emulation.

15 Claims, 5 Drawing Sheets

KEYBOARD DIVIDED BY CENTRAL INVERTED T-SHAPED ENTRY-SPACE KEY

BACKGROUND OF THE INVENTION

The present invention relates generally to keyboards, which may be used with any machines for communicating, storing, processing or retrieving information, such as computers, typewriters, telegraphs, type composing machines, siphering machines, etc.

When the typewriter became a commercial success in the 1890's after a long history of experiment, a variety of keyboard layouts were in use. Some machines used the type-bar mechanisms which later became universal for wholly mechanical typewriters. Because the early type-bar mechanisms were liable to jam if adjacent keys were struck in quick succession, the letters were arranged on the keyboard to avoid such sequences. The resulting so-called "Universal" keyboard, now generally known as QWERTY from its letter sequence, is inefficient in human terms, as only 50% of letters struck lie on the most used row, and the fingers must make many reaches to the other rows. A common standard keyboard layout, developed with the objective to exclude the type-bar jams, proved a commercial necessity and has become the standard for all languages written with the Latin alphabet.

With the advent of electronic computers the QWERTY keyboard has been enlarged by the addition of a ten key numerical keypad as used on calculators, duplicating the ten numeric keys on the top row of the typewriter layout to increase the speed of numeric data entry, at least four cursor movement keys, and a growing number of other machine function keys having fixed or program assigned meanings. Leading computer manufacturers are now supply universal word and data processing keyboards having over 100 keys.

Many investors have endeavored to improve the typewriter keyboard layout. The best known work is that of Dvorak et al, who described in 1932 a letter arrangement optimized in terms of carefully chosen criteria including letter frequencies and the relative strength and agility of the fingers. Other inventors have worked on the shape of the keyboard, variously proposing key rows curved to match the natural arc of the fingers, multiple key rows disposed in double curved bowl shapes to ease the reaches, thumb keys oriented nearly at right angles to the fingers keys to better exploit the strength and agility of the thumbs, and a general outward tilt of the two sides of the keyboard for the comfort of wrists. The gain in speed from any of these performance optimized keyboards appears limited, and is tentatively estimated in Siebel (1972) at no more than 10%.

The speed of 40-60 words per minute expected from a competent typist requires so-called 'touch-typing', that is reading manuscript while simultaneously operating the keyboard with only tectile and audible feedback. To do this, the stimulus-response bonds which link letters and common group of letters to the finger movements, which type them, must be thoroughly learnt. These bonds are sequence dependent, and the reaches over the rows and columns make them complex. Untrained persons such as the journalists, authors, professionals and managers who now increasingly use computers without the intervention of specialists keyboard operators are unable to key at more than about 15 words per minute, even with much practical experience, because in typing the hands must "hang" over the keyboard to allow the finger out-stretching in the plane and direction which does not coincide with the natural least constrained contraction-extension movement of fingers. As professionals and managers are generally not willing to undergo formal keyboard training, the computer is of less benefit to them than it could be.

The cursor movement keys of the extended QWERTY keyboard give very limited movement capability. A single press moves the cursor one place up, down or sideways, as a king moves in chess. A press and hold brings into action after a delay of about half a second an auto-repeat function which moves the cursor at a fixed, rather slow speed in the chosen direction, but still moving it as a rook. Moves between two arbitrary points have to be made as a series of zig-zags. The cursor cannot move as a queen. The fixed auto-repeat speed, necessarily a comprise, is time-consuming on long course moves and yet fast enough to lead to overshoots if the user is not very careful. To overcome these limitations, auxiliary devices such as the mouse, used to generate XY coordinates, is being adopted for cursor movement and for graphical work. The ease of cursor movement with these devices is particularly important in supporting machine languages which exploit to the full the human preference for communicating by showing rather than telling. These auxiliary devices have however the disadvantage in textual work that one hand must be moved frequently between the keyboard and the mouse, which is disorienting and time-consuming.

A further disadvantage of the conventional keyboard is the high risk of accidentally initiating computer action by pressing the 'Enter' key before one means to, due to its placement at the front of the keyboard next to the right shift key. The occasional proposals in the data processing art for thumb keys, operating in a plane differing from that of the other finger keys, are related to the unused strength and agility of thumbs which belong to the strongest fingers which are least active over the keyboard.

SUMMARY OF THE INVENTION

Accordingly, it is an object of the present invention to provide a keyboard which eliminates the disadvantages of the prior art.

More particularly, it is an object of the present invention to provide a keyboard which is ergonomically designed to take maximum advantage of the shape, dexterity, and strength of the hands and fingers so that the majority of the fingers on both hands are always positioned on the home keys, requiring less efforts in outreaching to the other keys.

In keeping with these objects and with others which will become apparent hereinafter, one feature of the present invention resides, briefly stated, in a keyboard which has a plurality of regular keys forming substantially two rectangular fields, subdivided by an inverted T-shaped key into two sections: one for preferably left-hand operation, and another for preferably right-hand operation.

The main benefit of the keyboards subdivided by the inverted T-shaped key into two section is that it facilitates touch-typing with hands essentially fixed on a desk.

In accordance with another feature of the present invention: rows of keys are located on a tilted flat plane or on a concave cylindrical surface. The axis of curvature of the cylindrical surface intersects a vertical central line of the inverted T-shaped key at 75°-90° angle from the left and from the right, respectively.

Still another feature of the present invention is that the columns of the keys are arranged in parallel grooves, which are located on the flat tilted surface or on the concave cylindrical surface.

In accordance with a further feature of the present invention a trackball is located at the keyboard top part, on a vertical central line of the inverted T-shaped key.

An additional feature of the present invention is that each key is provided with a depression which can have a truncated-cone shape, and a key top with a matching truncated-cone snap insert can be attached to the key by inserting the snap insert into the depression.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
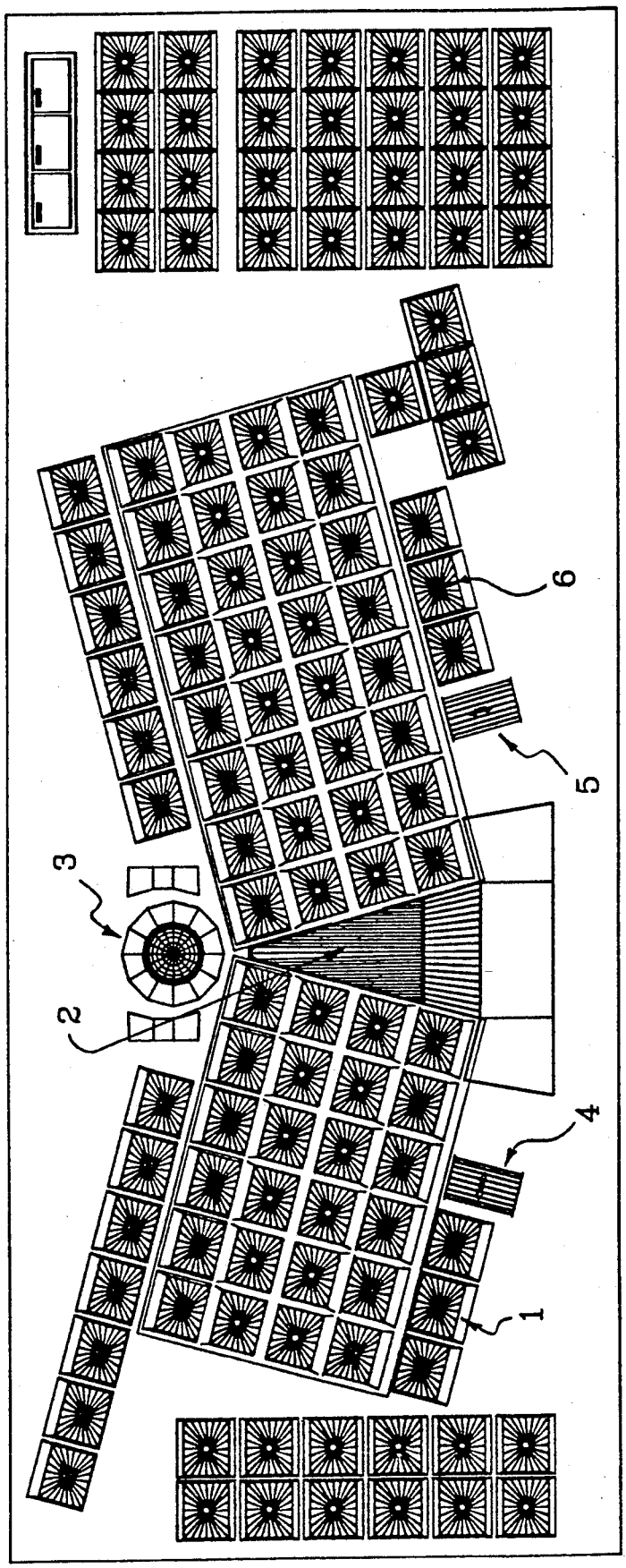
FIG. 1 is a view schematically showing a new keyboard in accordance with the present invention.

A keyboard in accordance with the present invention has a plurality of regular keys identified with reference numeral 1 and is subdivided into two sections by an inverted T-shaped key 2: one section for preferably left-hand operation and the other for preferably right-hand operation as shown in FIG. 1. The upper part of the inverted T-shaped key can be used for 'Enter' function and the lower part of the same can be used for 'Space' function.

Figure 2:
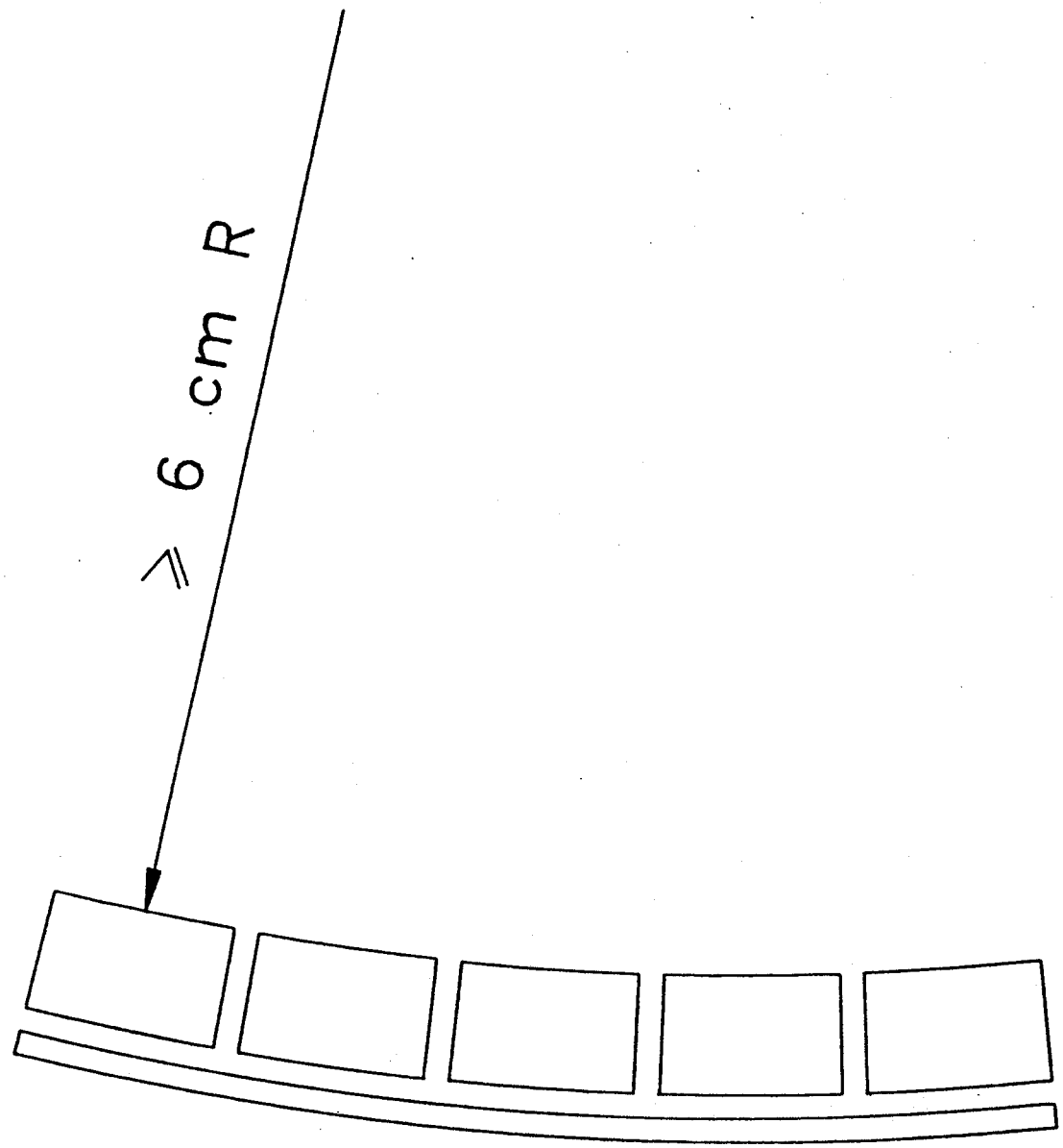
FIG. 2 is a view showing a transverse cross-section of one column of the keys of the keyboard.

Both sections of the inventive keyboard include four parallel key-rows comprising in the left-hand section six parallel key-columns, and in the right-hand section comprising eight parallel key-columns. As can be seen from FIG. 2 the key rows in the left-hand and in the right-hand sections, respectively, are located on a concave cylindrical surface with a radius of curvature of at least 6 cm and a cylindrical axis parallel to the key-row. The curvature radius of 6 cm is determined by the average distance between finger tips and knuckles of keyboard user's hands with the fingers curved in a moderate arc and the wrists straight. To save the depth of a keyboard, as it is required for a miniature keyboards of portable and pocket computers, the curvature radius can be increased to infinity thus forming a flat surface for allocation of keys. The axes of rotation of the cylindrical surfaces of the preferentially left-hand and right-hand sections intersect the vertical central line of the inverted T-shaped key at the angle of 75°-90° from the left and from the right, respectively.

Figure 3:
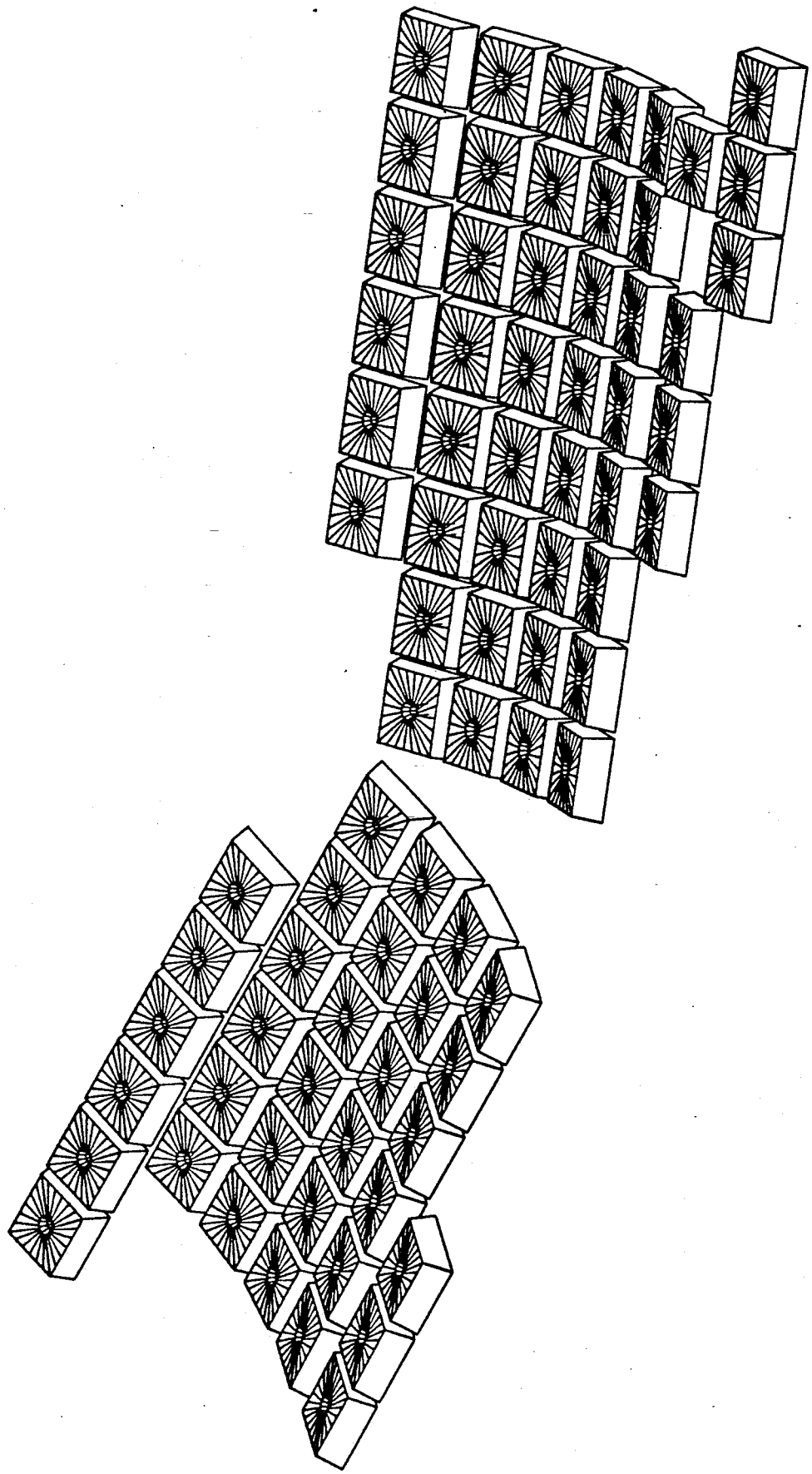
FIG. 3 is a schematic top view of a portion of the inventive keyboard.

As can be seen from FIG. 3 the key-columns are arranged in parallel lines. The keys or more particularly the key caps have cylindrical top depressions, and the keys are arranged in parallel grooves located on the concave surface mentioned hereabove.

The upper part of the central key performing 'Enter' function is located between the preferentially left-hand and right-hand sections. The lower part of the central key performing 'Space' function, partly extends to the area below the left-hand and the right-hand sections.

As shown in FIG. 1 a trackball 3 is placed at the keyboard top part, at the vertical central line of the T-shaped key, and two rollers 4 and 5 are positioned to the left and to the right of the trackball and have axes of rotation extending parallel to the vertical line of the inverted T-shaped key. The trackball and the rollers together constitute a device to be used for the cursor free movement. The trackball and/or the rollers are used for mouse emulation. They facilitate the usage of mouse-based software on all computers, laptops, and pocket computers since they require the minimum shift of hands from the home position.

Preferably, the trackball allows the cursor movement to be performed by the left or by the right forefinger. The left and right rollers control the cursor movement along the horizontal X—X line and along the vertical Y—Y line, respectively. Concurrent action of both rollers ensure all the movements necessary for a mouse emulation. The cursor movement velocity is controlled by a differential amplifier: the faster you roll it the faster it moves across the screen, while at slow rotation it moves slowly ensuring high accuracy in cursor positioning. The two keys placed next to the left and right rollers, respectively, could be pressed down performing in this manner the push-button function of the conventional two-button mouse.

The central T-shaped key is designed to be operated by the left or by the right forefinger. The 'Space' part of it provides additionally the choice to be actuated by the left or by the right thumb or by the left or the right forefinger.

Preferably, the keyboard includes 12 function keys, arranged on the left side and 12 function keys arranged on the top of the keyboard, thus combining both commercial layouts in one keyboard. This feature facilitates the development of software using 24 function keys.

Figure 4B:
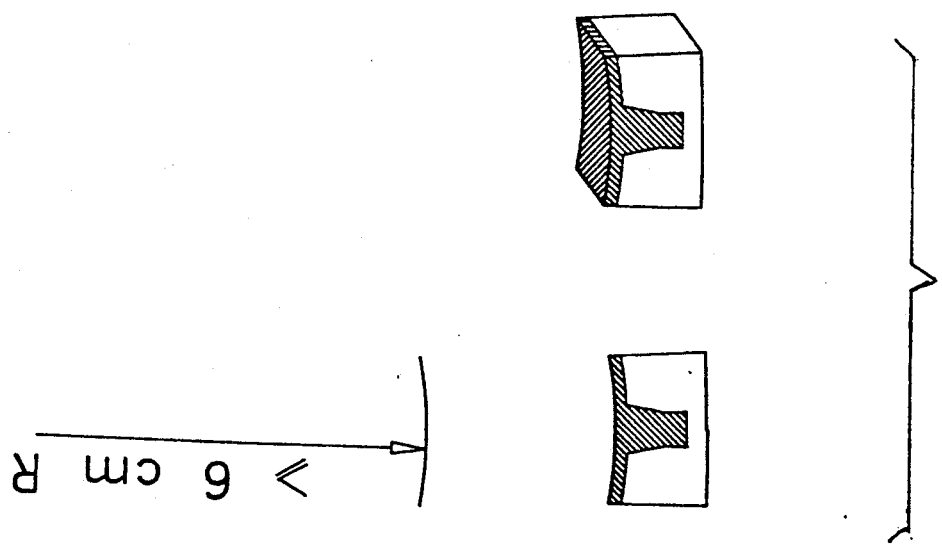
FIGS. 4a and 4b are views showing individual keys and key-tops of the inventive keyboard.
Figure 4A:
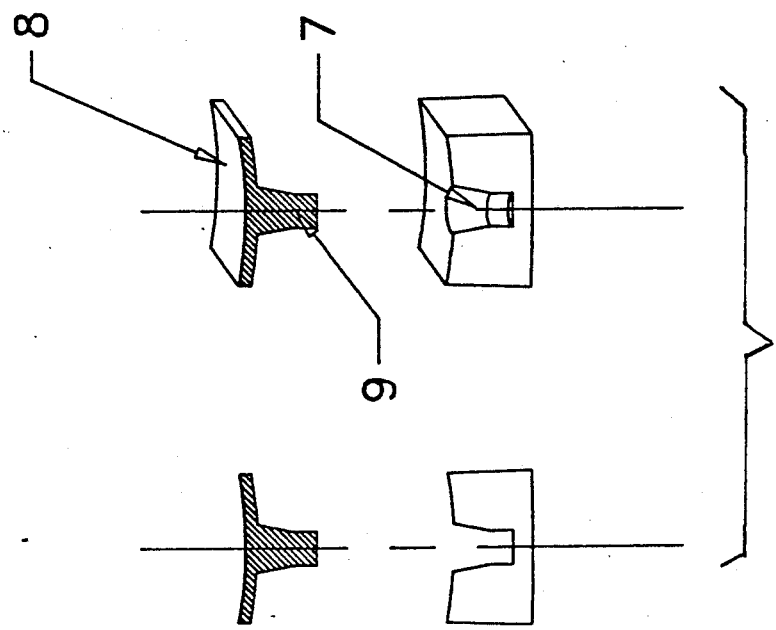

The arrangement of the four key-rows in the left-hand and right-hand sections on the concave cylindrical surfaces with the above mentioned curvature radius and with the cylinder axis parallel to the key rows and intersecting the vertical central line of the inverted T-shaped key from the left and from the right, respectively, accommodates best the natural curve of the hands at rest with the fingers in a moderate arc and the wrists straight. Key caps shown in FIGS. 4a and 4b have top cylindrical depressions such that the depressions in a key column form a continuous groove with the central line, preferably perpendicular to the key rows as shown in FIG. 3. A truncated-cone hole 7 is provided in the center of each key cap and helps to center fingers and develop their motor reaction in touch-typing training. After completion of the touch-typing course, and acquiring sufficient proficiency in typing, the truncated-cone hole 7 is used for inserting a thin plastic key-top 8 with a matching truncated-cone snap insert 9 as shown in FIGS. 4a and 4b. The plastic key-tops may be used for customizing each keyboard and selecting the layout of the keys most suitable for the customer. For example, on all commercial keyboards the key row of numbers and symbols is located at the top. The plastic key-tops and the macro function, built into the keyboard, allow a user to place the key row of numbers and symbols at the bottom line of the left-hand and right-hand sections of the keyboard, out of reach of the key pool that is used more than 90% of the total touch-typing time.

Figure 5:
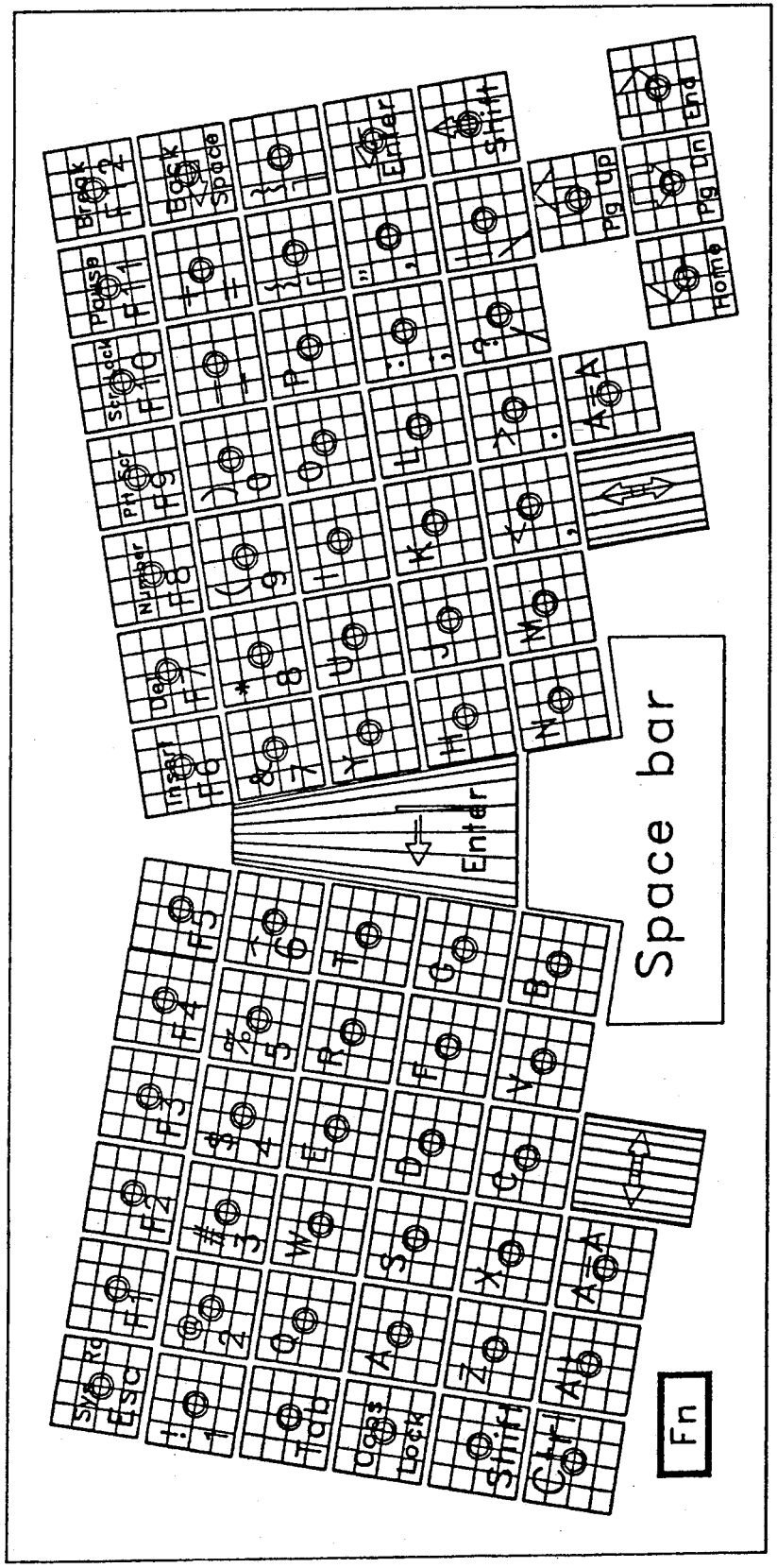
FIG. 5 is a view showing a miniaturized keyboard for laptop and pocket computers.

The proposed keyboard preserves the high ergonomic potential when used for miniaturized keyboards for laptop and pocket computers as shown in FIG. 5. The rollers for cursor free movement on a miniature keyboard are located to the left and to the right of 'Space' key. The rollers may be actuated by left and right thumbs, respectively, without substantial movement of the hands from the home position. The two additional keys located at the left and right ends of the 'Space' key serve for the actuation of roller-mouse-emulation functions. The concurrent action of the two rollers enables to use them for mouse emulation on the laptops and pocket computers.

It will be understood that each of the elements described above, or two or more together, may also find a useful application in other types of constructions differing from the types described above.

While the invention has been illustrated and described as embodied in a keyboard, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A keyboard, comprising a plurality of regular keys; and an inverted T-shaped key located in a middle of the keyboard, having a 'Space' and an 'Enter' function, and subdividing said regular keys into two sections including one section for preferably left-hand operation and another section preferably for right-hand operation.

2. A keyboard as defined in claim 1, wherein said T-shaped key has a bottom portion provided for a 'Space' function and a top portion provided for an 'Enter' function.

3. A keyboard as defined in claim 1, wherein said regular keys are arranged in rows of keys, said rows of keys being located on a tilted flat plane.

4. A keyboard as defined in claim 1, wherein said regular keys are arranged in key columns located on a flat tilted surface.

5. A keyboard, comprising a plurality of regular keys; and an inverted T-shaped key subdividing said regular keys into two sections including one section for preferably left-hand operation and another section for preferably right-hand operation, said regular keys being arranged in rows of keys, said rows of keys being located on concave cylindrical surfaces.

6. A keyboard as defined in claim 5, wherein said concave cylindrical surfaces have rotation axes extending parallel to said row of keys in the left and in the right section of the keyboard.

7. A keyboard as defined in claim 6, wherein said rotation axes intersect the vertical central line of said inverted T-shaped key at 75°–90° from the left and from the right, respectively.

8. A keyboard, comprising a plurality of regular keys; an inverted T-shaped key subdividing said regular keys into two sections including one section for preferably left-hand operation and another section preferably for right-hand operation; and a trackball located at a top part of the keyboard at a vertical central line of said inverted T-shaped key.

9. A keyboard, comprising a plurality of regular keys; an inverted T-shaped key subdividing said regular keys into two sections including one section for preferably left-hand operation and another section for preferably right-hand operation; and two rollers located at a top or a bottom part of a keyboard to the left or to the right of a vertical central line of said inverted T-shaped key.

10. A keyboard, comprising a plurality of regular keys; an inverted T-shaped key subdividing said regular keys into two sections including one section for preferably left-hand operation and another section for preferably right-hand operation, said regular keys being arranged in key columns located on concave cylindrical surfaces with a curvature radius of 6 cm or more.

11. A keyboard, comprising a plurality of regular keys; and an inverted T-shaped key subdividing said regular keys into two sections including one section for preferably left-hand operation and another section for preferably right-hand operation, each of said regular keys having a top cylindrical depression.

12. A keyboard as defined in claim 11, wherein said top cylindrical depressions in each column of said keys together form a continuous groove with the central line substantially perpendicular to the rows of said keys.

13. A keyboard, comprising a plurality of regular keys; and an inverted T-shaped key subdividing said regular keys into two sections including one section for preferably left-hand operation and another section for preferably right-hand operation, each of said keys having a key cap provided with a central hole helping to center a finger and develop a finger motor reaction in touch-typing training.

14. A keyboard as defined in claim 13; and further comprising a key top mountable on each of said key caps and having a snap insert for its fixation in said central hole.

15. A keyboard as defined in claim 14, wherein said central hole and said insert have a truncated-cone shape.

* * * * *